United States Patent
Rao et al.

(10) Patent No.: US 11,153,613 B2
(45) Date of Patent: *Oct. 19, 2021

(54) REMOTE-CONTROLLED MEDIA STUDIO

(71) Applicants: Sling Media L.L.C., Foster City, CA (US); Sling Media PVT Ltd, Bangalore (IN)

(72) Inventors: Padmanabha R. Rao, Palo Alto, CA (US); Satish Iyer, Bangalore (IN)

(73) Assignees: Sling Media L.L.C., Foster City, CA (US); Sling Media PVT Ltd., Bangalore (IN)

( * ) Notice: Subject to any disclaimer, the term of this patent is extended or adjusted under 35 U.S.C. 154(b) by 0 days.

This patent is subject to a terminal disclaimer.

(21) Appl. No.: 16/891,911

(22) Filed: Jun. 3, 2020

(65) Prior Publication Data
US 2020/0296432 A1 Sep. 17, 2020

Related U.S. Application Data

(63) Continuation of application No. 15/367,655, filed on Dec. 2, 2016, now Pat. No. 10,715,838.

(Continued)

(51) Int. Cl.
*H04N 21/218* (2011.01)
*H04N 21/234* (2011.01)
(Continued)

(52) U.S. Cl.
CPC ..... *H04N 21/234* (2013.01); *H04N 21/21805* (2013.01); *H04N 21/2365* (2013.01);
(Continued)

(58) Field of Classification Search
CPC ....... H04N 21/42204; H04N 21/21805; H04N 21/4316; H04N 21/482; H04N 21/2365; H04N 21/234
See application file for complete search history.

(56) References Cited

U.S. PATENT DOCUMENTS 7,312,812 B2 12/2007 Li et al.
8,522,300 B2 8/2013 Relyea et al.
(Continued)

FOREIGN PATENT DOCUMENTS

EP 2403236 A1 1/2012
EP 2498485 A2 9/2012
(Continued)

OTHER PUBLICATIONS

International Search Report and Written Opinion for PCT/US2016/064776 dated Mar. 13, 2017, all pages.

(Continued)

*Primary Examiner* — Joshua D Taylor
*Assistant Examiner* — Patrick A Ryan
(74) *Attorney, Agent, or Firm* — Kilpatrick Townsend & Stockton

(57) ABSTRACT

A system includes a computing device programmed to generate an aggregated media item that includes individual media items from a plurality of inputs. The aggregated media item combines one or more of the individual media items for a common display. The computing device is further programmed to send the aggregated media item to a media device and receive commands from the media device. The commands identify data from the aggregated media content item to be included in a media output item. The computing device is further programmed to generate the media output item based on the aggregated media content item and the commands.

20 Claims, 8 Drawing Sheets

Related U.S. Application Data

(60) Provisional application No. 62/263,085, filed on Dec. 4, 2015.

(51) Int. Cl.

| | | |
|---|---|---|
| *H04N 21/472* | (2011.01) | |
| *H04N 21/462* | (2011.01) | |
| *H04N 21/4227* | (2011.01) | |
| *H04N 21/81* | (2011.01) | |
| *H04N 21/4223* | (2011.01) | |
| *H04N 21/478* | (2011.01) | |
| *H04N 21/431* | (2011.01) | |
| *H04N 21/2365* | (2011.01) | |
| *H04N 21/414* | (2011.01) | |
| *H04N 21/422* | (2011.01) | |
| *H04N 21/438* | (2011.01) | |
| *H04N 21/442* | (2011.01) | |
| *H04N 21/466* | (2011.01) | |
| *H04N 21/482* | (2011.01) | |
| *H04N 21/643* | (2011.01) | |

(52) U.S. Cl.
CPC ... *H04N 21/41407* (2013.01); *H04N 21/4223* (2013.01); *H04N 21/4227* (2013.01); *H04N 21/42204* (2013.01); *H04N 21/4316* (2013.01); *H04N 21/4383* (2013.01); *H04N 21/44218* (2013.01); *H04N 21/4622* (2013.01); *H04N 21/4667* (2013.01); *H04N 21/4781* (2013.01); *H04N 21/47205* (2013.01); *H04N 21/482* (2013.01); *H04N 21/64322* (2013.01); *H04N 21/8173* (2013.01)

(56) References Cited

U.S. PATENT DOCUMENTS

| | | |
|---|---|---|
| 10,715,838 B2 | 7/2020 | Rao et al. |
| 2002/0196327 A1 | 12/2002 | Rui et al. |
| 2006/0117371 A1 | 6/2006 | Margulis |
| 2009/0177758 A1 | 7/2009 | Banger et al. |
| 2010/0304731 A1 | 12/2010 | Bratton et al. |
| 2011/0035466 A1 | 2/2011 | Panigrahi |
| 2013/0129304 A1 | 5/2013 | Feinson |
| 2013/0198629 A1 | 8/2013 | Tandon et al. |
| 2013/0222601 A1 | 8/2013 | Engstrom et al. |
| 2014/0053214 A1 | 2/2014 | Walker et al. |
| 2014/0109144 A1 | 4/2014 | Asnis et al. |
| 2014/0137162 A1 | 5/2014 | McNamee et al. |
| 2014/0269930 A1 | 9/2014 | Robinson et al. |
| 2015/0006753 A1 | 1/2015 | Krikorian et al. |
| 2015/0135234 A1 | 5/2015 | Hall |
| 2017/0164058 A1 | 6/2017 | Garcia Navarro |

FOREIGN PATENT DOCUMENTS

| | | |
|---|---|---|
| JP | 61032683 A | 2/1986 |
| JP | 04291891 A | 10/1992 |
| JP | 7015708 A2 | 1/1995 |
| JP | 07221843 A | 8/1995 |
| JP | 07250313 A | 9/1995 |
| JP | 08163526 A | 6/1996 |
| JP | 8210472 A2 | 8/1996 |
| JP | 8242413 A2 | 9/1996 |
| JP | 08317366 A | 11/1996 |
| JP | 10092541 A2 | 4/1998 |
| JP | 10290410 A2 | 10/1998 |
| JP | 11-64046 A | 3/1999 |
| JP | 2000069457 A | 3/2000 |
| JP | 2002290953 A2 | 10/2002 |
| JP | 2003143546 A | 5/2003 |
| JP | 2003234848 A | 8/2003 |
| JP | 2003348569 A | 12/2003 |
| JP | 2004165804 A | 6/2004 |
| JP | 2004336569 A | 11/2004 |
| JP | 2005094509 A | 4/2005 |
| JP | 2005229241 A | 8/2005 |
| JP | 2005303711 A | 10/2005 |
| JP | 2005531971 T2 | 10/2005 |
| JP | 2005341325 A | 12/2005 |
| JP | 2008227844 A | 9/2008 |
| JP | 2009267999 A | 11/2009 |
| JP | 2012023710 A | 2/2012 |
| JP | 2012105289 A | 5/2012 |
| JP | 2012105289 A2 | 5/2012 |
| JP | 2013132828 A2 | 7/2013 |
| JP | 2013258532 A | 12/2013 |
| WO | 04004322 A1 | 1/2004 |
| WO | 2008024723 A2 | 2/2008 |

OTHER PUBLICATIONS

Decision of Rejection for Japan Patent Appln. No. 2018-528972 received Mar. 24, 2020, all pages.
Japan Office Action dated May 21, 2019 for JP Pat. Appln. No. 2018-528972, all pages.
Canada Office Action dated Apr. 15, 2019 for CA Pat. Appln. No. 3,007,360, all pages.
European Office Action for Application No. 16822801.3 dated Feb. 19, 2021, all pages.

… (1)

REMOTE-CONTROLLED MEDIA STUDIO

CROSS-REFERENCE TO RELATED APPLICATIONS

This application is a continuation of U.S. patent application Ser. No. 15/367,655, filed on Dec. 2, 2016, entitled "Remote-Controlled Media Studio," which application claims priority to and all benefits of U.S. Provisional Patent Application No. 62/263,085 filed on Dec. 4, 2015.

BACKGROUND

The use of streamed media data such as video data has increased rapidly. Videos are used for instructional purposes, to record and view sports events, to share personal and family events, to sell real estate, etc. Security cameras, traffic cams, etc. provide streams of media data, which may be collected and monitored at a single location. Drones equipped with video cameras provide yet another platform for the generation and streaming of videos. Users may wish to mix data from multiple input data streams into a single output data stream to view immediately or to store for later viewing.

DRAWINGS

DETAILED DESCRIPTION

System Overview

A media processing system including a media studio allows the user to bring the studio along to live events. The user may preview multiple media input items, generate a media output item based on the multiple media input items, share the media output item, and store the media output item for future viewing, all via a remote operator console.

Figure 1:
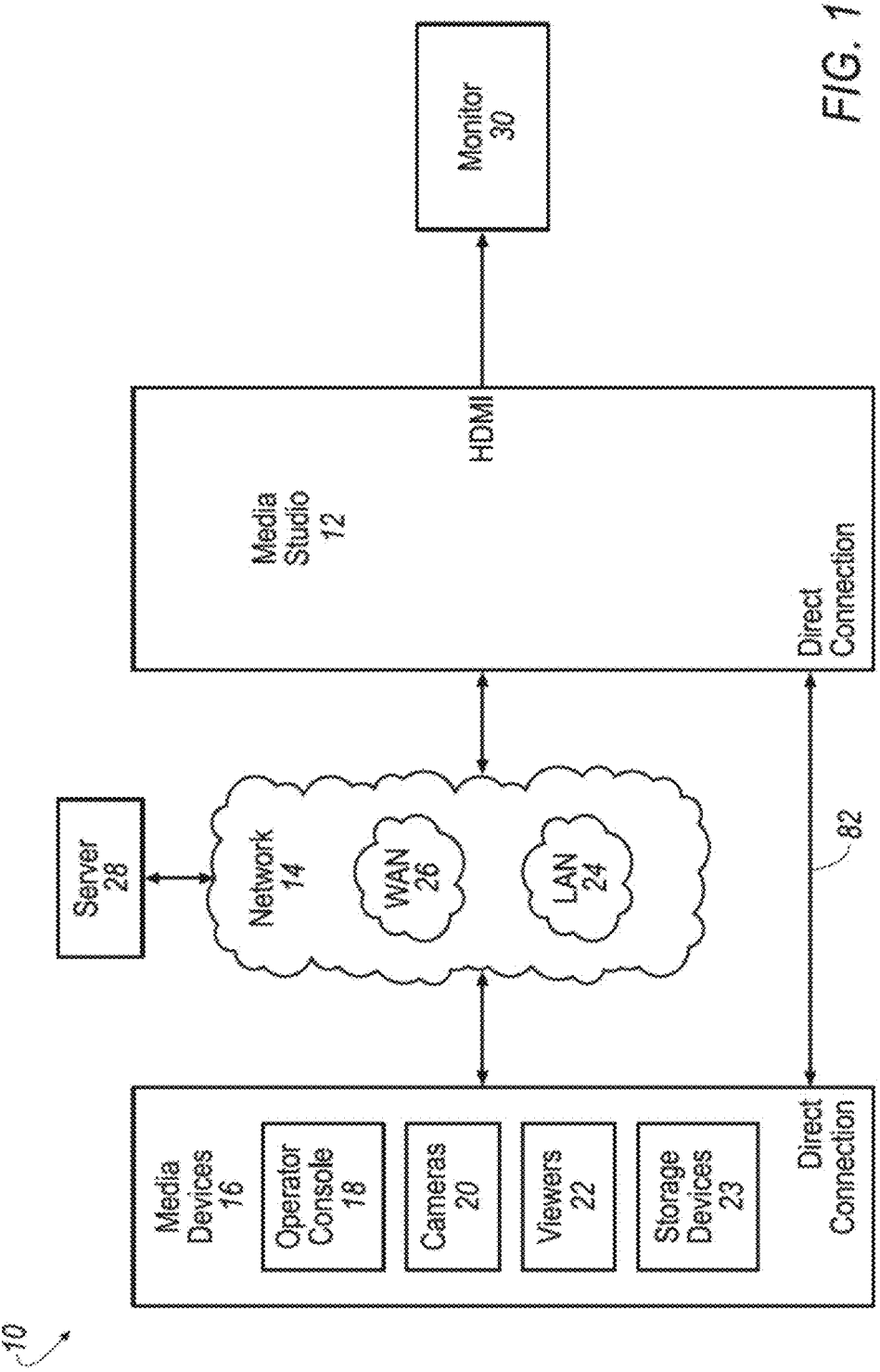
FIG. 1 is a block diagram of an exemplary media processing system for capturing and mixing multiple media streams into an output media stream.

Referring to FIG. 1, a media processing system 10, including a media studio 12, is operable to receive media input data from one or more media devices 16. The media input data may be received via one or more wired and wireless networks 14 and one or more wired or wireless direct connections. Receiving media data may include receiving media data sent from a media device 16, e.g., a camera 20, or retrieving data, e.g., from a storage device 23. The media studio 12 is further operable to be controlled by and receive media input data from an operator console 18, which may be remote to the media studio 12.

The media studio 12 is further operable to generate media output data and provide the media output data to media devices 16, e.g., a viewer 22. The system 10 allows a user to produce media output data at a location where the recording (or a portion of the recording) is taking place. Controlling the media studio 12 via a remote operator console 18 provides the user the freedom to move about the recording location while maintaining oversight and control over the production process.

Exemplary System Elements

Referring now to FIG. 1 in more detail, the media processing system 10 includes a media studio 12, and one or more media devices 16. The one or more media devices 16 include the operator console 18, and may further include one or more cameras 20, one or more viewers 22 and one or more media storage devices 23. The media devices 16 may be remote or local to the media studio 12 and may be coupled to the media studio 12 via at least one of a network 14 and a direct wired or wireless connection. A server 28 may also be communicatively coupled to the media studio 12 and the media devices 16 via the networks 14. Additionally, the media processing system 10 may include a computer or television monitor 30 communicatively coupled to the media studio 12.

The media studio 12 is operable to receive multiple media input items, and to combine them into a multiview media item for viewing via the operator console 18. The media input items are sometimes referred to herein as individual media items. The multiview media item is an aggregated media content item that includes one or more of the media input items, arranged to be displayed substantially simultaneously on a user display, such as a touch screen. The media input items may be arranged such that they appear side-by-side, in rows, in a picture-in-picture format, etc. within the user display. In addition, the multiview media item may include, for example, a graphical user interface which is displayed on the user display and accepts user inputs. As described below, the media studio 12 may compress the multiview media item prior to providing it to one of the media devices 16 such as the operator console 18 and/or the storage devices 23.

The media input items may be visual and/or audio data such as videos captured by a video camera, sounds captured by a microphone, scenes from a security camera, etc. The media input items may be, e.g., streamed data or static data such as single digital photographs. The media studio 12 is further operable to receive commands from the operator console 18, and to generate a media output item according to the received commands. The media output item may include data from one or more of the media input items.

As an example, the media studio 12 may receive four media input items. The media studio 12 may generate a multiview media item including each of the four media input items, and transmit the multiview media item to the operator console 18. A user of the operator console 18 may select, via a user interface, one of the four views in the multiview media item to be included in the media output item. Based on a command received from the operator console 18, the media studio 12 may generate the media output item that includes the selected media input item. The media output item may be transmitted via a network 14 to be shared with viewers or stored in a storage device 23.

In addition to selecting one or more media input items to be included in the media output item, the media studio 12 may perform various media processing functions. The media processing functions may be performed based on commands received from the operator console. A nonlimiting list of processing functions that may be performed by the media studio 12 includes scaling, mixing, morphing, compositing, adding overlays, etc. In addition, the media studio may perform functions such as object tracking, image stabilization, etc. The operation of the media studio 12 will be discussed in greater detail below.

Communications between the media studio 12 and the media devices 16 may occur via the network 14 and via direct connections 82. In general, the network 14 represents one or more mechanisms for delivering media content between the media studio 12 and the media devices 16. Accordingly, the network 14 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) 24 such as a WiFi network or Ethernet, and/or wide area networks (WAN) 26, such as the Internet, etc.

In addition to the one or more networks 14, one or more wired or wireless direct connections 82 may be used to connect the media studio 12 to the media devices 16. Direct connections 82 may include e.g., Bluetooth, Universal Serial Bus (USB), high-definition multimedia interfaces (HDMI), custom serial interfaces, etc.

In particular, one or more high-definition multimedia interfaces (HDMI) may be used to transfer data between a media device 16 and the media studio 12, or from the media studio 12 to the monitor 30. HDMI is a well-known, proprietary audio/video interface for transferring uncompressed video data and compressed or uncompressed digital audio data from an HDMI-compliant source device such as the media device 16 to a digital media processing device such as the media studio 12 or to the compatible computer monitor, e.g., the monitor 30.

The server 28 may be communicatively coupled to the media studio 12 and the media devices 16 via the network 14. The server 28 may include a communications circuit for communications via the network 14, and may further include memory and one or more processors configured to perform programs, i.e., sets of computer-executable instructions, stored in the memory. The server 28 may, e.g., receive media output items and store the media output items for future use.

Media content, such as the media input items, media output items, and/or multiview media items, is generally delivered via the network 14 in a digital format, e.g., as compressed audio and/or video data, and may include media data and metadata. For example, MPEG refers to a set of standards generally promulgated by the International Standards Organization/International Electrical Commission Moving Picture Experts Group (MPEG). H.264 refers to a standard promulgated by the International Telecommunications Union (ITU). Accordingly, by way of example and not limitation, media content may be provided in a format such as the MPEG-1, MPEG-2, or the H.264/MPEG-4 Advanced Video Coding standards (AVC) (H.264 and MPEG-4 at present being consistent), HEVC/H.265, or according to some other standard or standards. For example, media content could be audio data formatted according to standards such as MPEG-2 Audio Layer III (MP3), Advanced Audio Coding (AAC), etc. Further, the foregoing standards generally provide for including metadata.

Media devices 16 include the operator console 18, and may include one or more cameras 20, one or more viewers 22 and one or more storage devices 23. The operator console 18 may be used to control the operation of the media studio 12, and in some cases, may also perform the function of a media input device 16 such as a camera 20, as described below.

The camera 20 captures media data, i.e., visual and sound data such as photographs and videos, and transmits the media data, e.g., via the network 14, to the media studio 12. Examples of cameras 20 include portable devices such as smartphones, tablets, laptops, digital cameras, etc., including one or more data collectors for collecting media data. The collected media data may include visual data and audio data. Examples of cameras 20 may further include security cameras, traffic cams, cameras transported by drones, etc.

The camera 20 may collect and transmit the media data, e.g., via the network 14, or via the direct connection 82, to the media studio 12. The collected media data may be, e.g., full high-definition (Full HD) data, providing an image resolution of 1920 by 1080 pixels. Data formats with other resolutions may also be used.

The viewer 22 may be used to display media output data received from the media studio 12, and may include a display such as a liquid crystal display (LCD) or plasma display. The media data may be received, for example, via the network 14 or via the direct connection 82. Examples of the viewer 22 include mobile devices such as mobile phones, tablets, and laptops and may further include devices such as digital televisions. The viewer 18 may receive, e.g., Full HD data, providing an image resolution of 1920 by 1080 pixels. Data formats with other resolutions may also be used.

The storage device 23 may store media data and provide an interface to allow the media studio 12 to access the data via the network 14 or via the direct connection 82. The media storage device may include one or more types of data storage such as read only memory (ROM), random access memory (RAM), flash memory, electrically programmable memory (EPROM), electrically programmable and erasable memory (EEPROM), embedded MultiMediaCard (eMMC), secure digital (SD) card, a hard drive, etc. Further, the media storage device 23 may include a processor, programmed, for example, to receive commands from the media studio 12. The processor may be further programmed, based on the commands, to retrieve media data items from data storage, and send the media data items to the media studio 12.

Communications between the storage device 23 and the media studio 12 may be performed via the network 14. Additionally or alternatively, communications may be performed via the direct connection 82. For example, the storage device 23 may be connected to the media studio 12 via a Universal Serial Bus (USB) port, or other wired or wireless interface.

Figure 2:
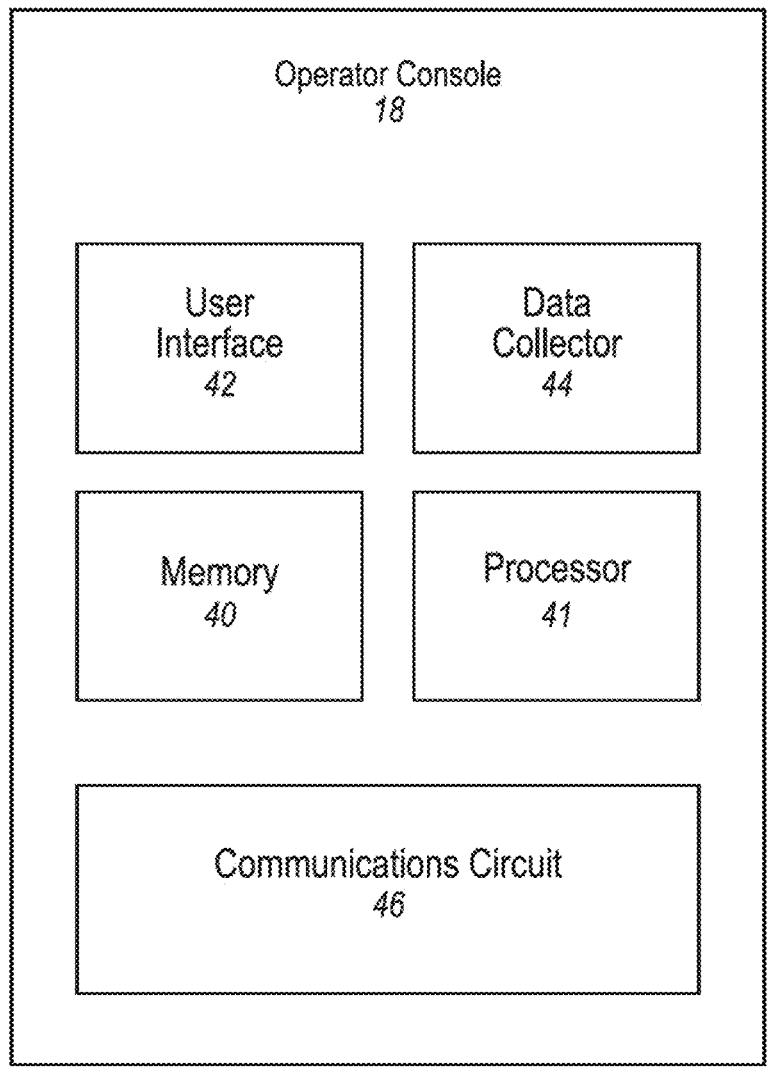
FIG. 2 is a block diagram of an exemplary operator console for the media processing system of FIG. 1.

The operator console 18 may be used to control the operation of the media studio 12. As shown in FIG. 2, the operator console 18 may include a memory 40 and a processor 41, the memory 40 storing program code, i.e., computer-executable instructions, executable by the processor 41. The processor 41 may be communicatively coupled to a user interface 42, a data collector 44, and a communications circuit 46.

The user interface 42 is communicatively coupled to the processor 41 and may include one or more input devices such as a microphone, buttons, a touchscreen display, a mouse, a keyboard, a gesture-recognition device, switches, etc., for receiving input from the user. The user interface 42 may further include one or more output devices such as a display, lamps, speakers, etc. for communicating information to the user. All or a portion of the user interface 42 may be physically separate from the operator console 18. For example, the operator console 18 may be a tablet computer which projects its output to another screen, (e.g., air-play), while the operator continues to control the media studio 12 from the tablet computer.

The data collector 44 may be, for example, a digital camera as is known that may collect media data. The media data may include visual data such a still photographs and video recordings and may further include audio data such as a sound recording or soundtrack. The data collector 44 may, e.g., output the media data to the processor 41.

The communications circuit 46 is communicatively coupled to the processor 41, and is configured to communicate with the media studio 12 via, e.g., the network 14 and/or the direct connections 82.

The communications circuit 46 may include a radio frequency (RF) transceiver for WiFi communications (typically 2.4 GHz or 5 GHz bands). The RF transceiver may communicate, for example, directly with a RF receiver included in the media studio 12. Additionally or alternatively, the communications circuit 46 may include, e.g., an Ethernet interface, a Universal Serial Bus (USB) interface, a Bluetooth transceiver, a high-definition multimedia interface (HDMI), etc.

Alternatively, the communications circuit 46 may communicate with the media studio 12 indirectly. For example, the communications circuit 46 may communicate with hotspot, i.e., a communications circuit including a router and client providing a connection to a wide area network (WAN) 26 such as the Internet. The media studio 12 may receive the communications via the WAN 26.

The processor 41 is communicatively coupled to each of the user interface 42, the data collector 44, and the communications circuits 46.

The processor 41 is programmed to control the operation of the media studio 12 based on inputs received from a user via the user interface 42. More specifically, the processor 41 is programmed to receive a media content item, also called an aggregated media item, e.g., a multiview media item including one or more views from one or more cameras 20, and to display the multiview media item via the user interface 42. The processor 41 is further programmed to receive input from the user via the user interface 42. For example, the user may view the multiview media item, and select one of the views to be included in a media output item generated by the media studio. The processor 41 may send a command to the media studio 12 to include the selected view in the media output item.

In addition to commands related to selecting media input items for display in the media output item, commands from the operator console 18 may include instructions to perform functions such as scaling, mixing, morphing, compositing, adding overlays, etc. Further, commands from the operator console 18 may include instructions to perform functions such as object tracking, image stabilization, etc.

Figure 3:
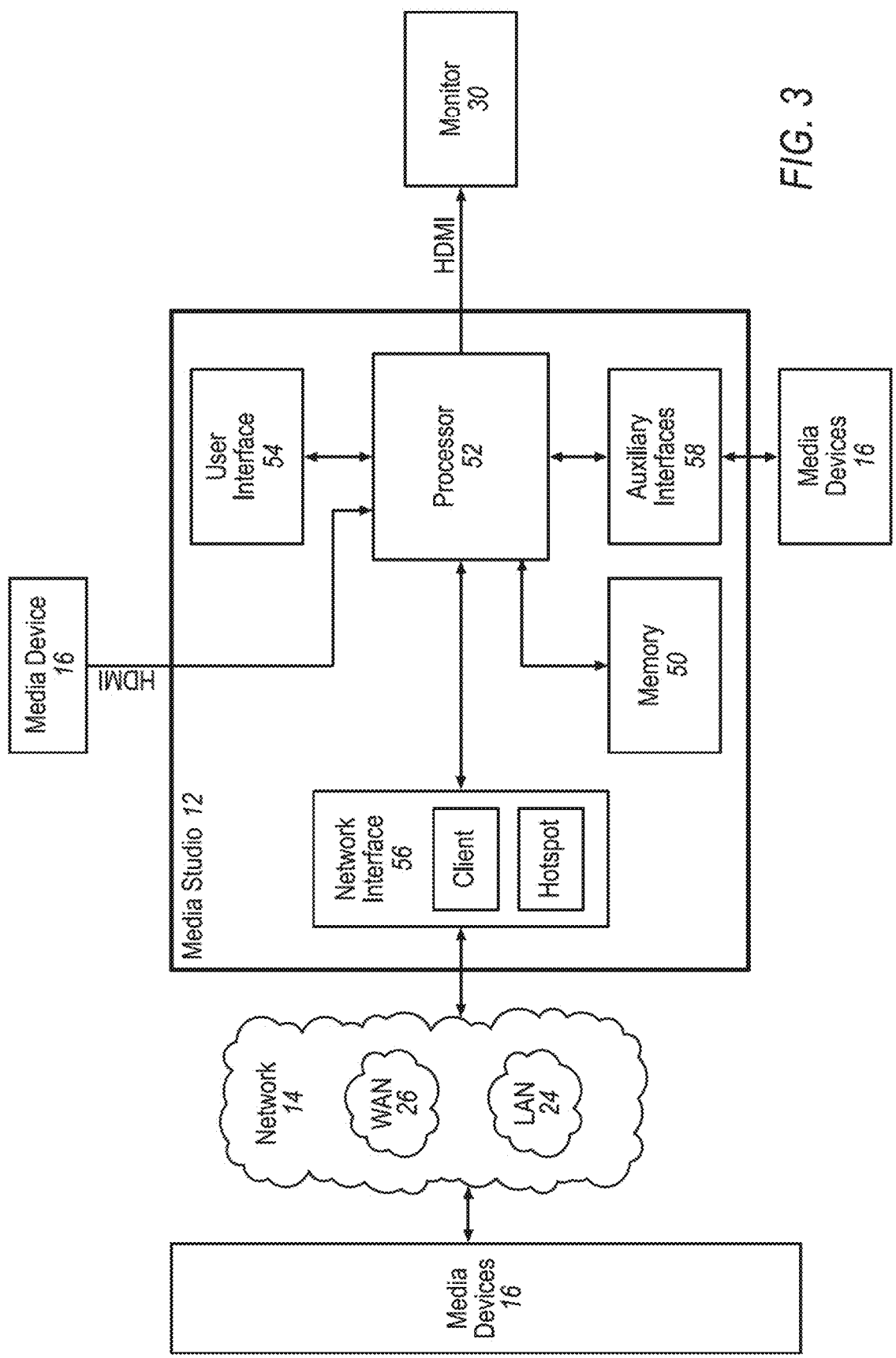
FIG. 3 is a block diagram of an exemplary media studio for the media processing system of FIG. 1.

An exemplary media studio 12 is shown in FIG. 3. The media studio 12 includes an internal memory 50 and a processor 52, the memory storing program code, i.e., computer-executable instructions, executable by the processor 52. The processor 52 is communicatively coupled to a user interface 54, a network interface 56, and an auxiliary interface 58.

The internal memory 50 may be, e.g., read only memory (ROM), random access memory (RAM), flash memory, electrically programmable memory (EPROM), electrically programmable and erasable memory (EEPROM), embedded MultiMediaCard (eMMC), a hard drive, etc., and may be used to store programs executable by the processor 52, as well as to store, for example, data representing inputs from the user, instructions received from the operator console 18, media data received from the remote media device 16, media metadata, etc.

The user interface 54 is communicatively coupled to the computer 52, and may include one or more output devices such as a display, lamps, speakers, etc. for communicating information to the user. The user interface 54 may further include one or more input devices such as buttons, a microphone, a touch screen display, a mouse, a keyboard, a gesture-recognition device, switches, etc., for receiving input from the user.

The network interface 56 includes one or more interfaces to the network 14. For example, the network interface 56 may include a hotspot, such as is known, for WiFi communications. The hotspot may include a router. The router may include a radio frequency (RF) transceiver for WiFi communications (typically 2.4 GHz or 5 GHz bands) and may be operable to receive multiple transmissions substantially simultaneously. The router may connect media devices 16 with the processor 52 of the media studio 12.

Additionally, the network interface 56 may include an Internet client. The Internet client is a mechanism for connecting to and communicating with the Internet, via, e.g., satellite communications or a cable network. The Internet client may include a transceiver and antenna for satellite communications, e.g., in the Ka band (18.3-30 GHz). The internet client may receive, via the network 14, Internet protocol (IP) communications from, e.g., media devices 16.

The network interface 56 may further include hardware, software, and firmware that support communications with, e.g., portable and mobile devices in the cellular frequency bands, and that may operate, for example, according to the 4G LTE protocols as defined by the 3GPP standards body, or another suitable wireless communications protocol.

In addition to connecting the media devices 16 with the processor 52 of the media studio 12, the router and the Internet client may be used in combination to provide Internet access for media devices 16.

The auxiliary interface 58 may include one or more wired or wireless interface circuits that may be used, for example, to connect to one or more media devices 16. The media devices 16 may include, e.g., one or more storage devices 23. The auxiliary interface 58 may include a universal serial bus (USB) interface circuit to communicate with external USB devices, for example a memory stick or memory back-up device. As another example, the auxiliary interface 58 may include a MicroSD interface, as is known, to store data on and retrieve data from a MicroSD data card. Further, the auxiliary interface 58 may include, e.g., a Bluetooth interface for wireless connection to a media device 16.

Additionally, the media studio 12 may include a high-definition media interface (HDMI) for connecting to a media device 16, such as a camera 20.

The media studio 12 processor 52 is generally programmed to receive one or more media input items from one or more media devices 16. The media studio 12 processor 52 may, in some cases, generate a multiview media item. The multiview media item may include, for example, a picture-in-picture (PIP) display, wherein two or more of the media input items are displayed simultaneously, e.g., side-by-side, within the multiview media item. The media studio 12 may transmit the multiview media item via the network 14 to one or more of the media devices 16, such as the operator console 18 or the storage devices 23.

The media studio 12 processor 52 is further programmed to receive commands from the operator console 18. Based on the commands, the media studio 12 may generate a media output item. The media studio 12 may select data from one or more of the media input items to include in the media output item. The media studio 12 may further, based on commands received from the operator console 18, perform various media processing functions such as scaling, mixing, morphing compositing, adding overlays, tracking of specific people or objects, smart tagging etc. related to the generation of the media output item.

In addition, the media studio 12 may perform media processing functions based on predetermined rules for generating the media output item. Examples of rules are discussed below.

The media studio 12 processor 52 may output the media output item e.g., to viewers 22, to the operator console 18, and/or to other display devices. Additionally or alternatively, the media studio 12 may output the media output item, e.g., to a server 28, or to storage devices 23, where the media output item may be stored for future use. Exemplary implementations for the media studio 12 are described below.

Figure 4:
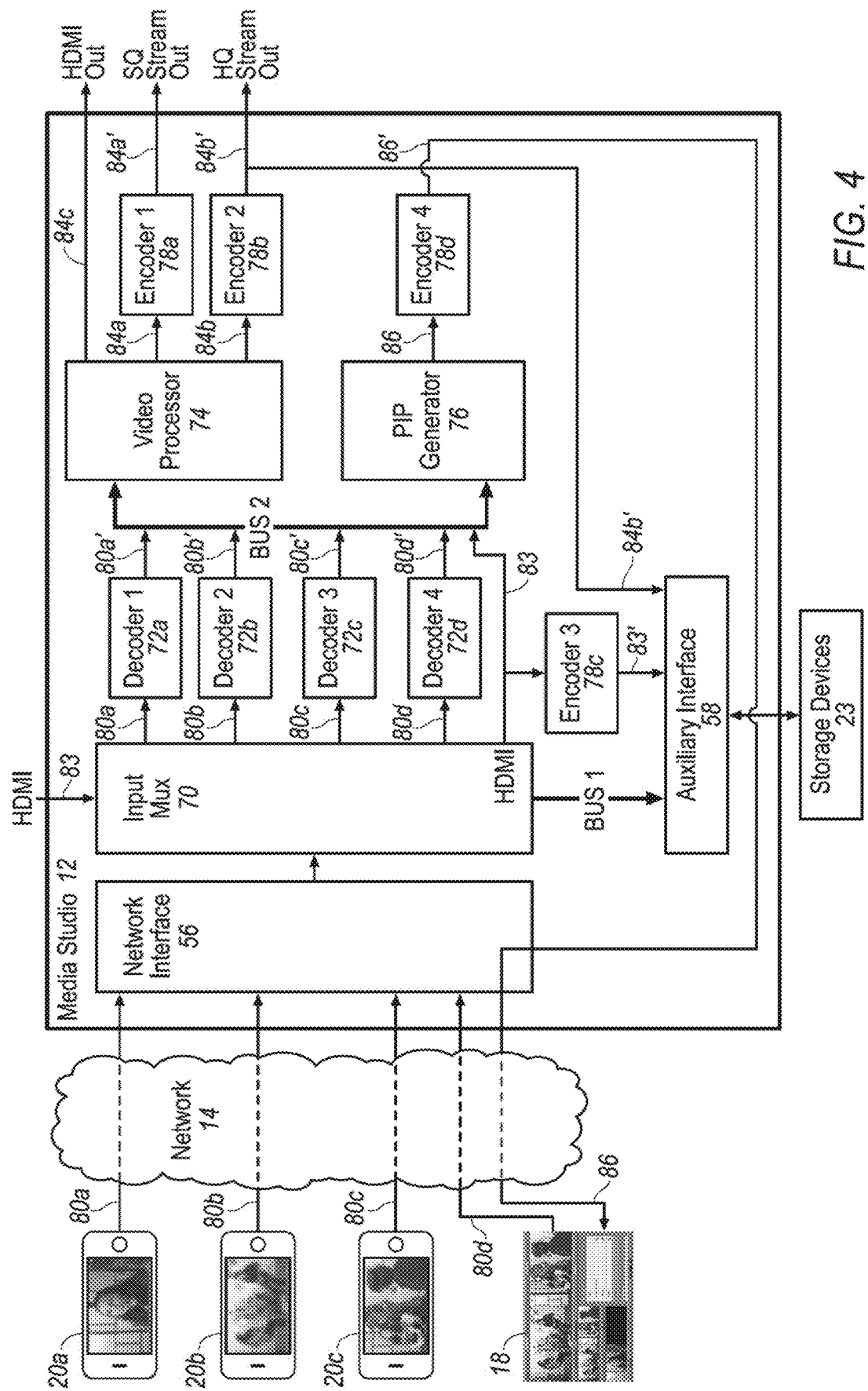
FIGS. 4-6 are block diagrams of exemplary implementations of the media processing system of FIG. 1.

A first exemplary implementation is shown in FIG. 4. The media studio 12 receives first, second, and third media input items 80*a*, 80*b*, 80*c*, respectively, from first, second, and third cameras 20*a*, 20*b*, 20*c*. Additionally, the media studio 12 receives a fourth media input item 80*d* from the operator console 18. Each of the first, second, third, and fourth media input items 80*a*, 80*b*, 80*c*, 80*d*, may be, for example, Full High Definition (Full-HD) and may include a picture resolution of 1920 by 1080 pixels. Data formats with other resolutions may also be used.

As described above, the media input items 80*a*, 80*b*. 80*c*, 80*d* may be received by the network interface 56 included in the media studio 12. The network interface 56 may include a router to support WiFi communications directly with the cameras 22 and operator console 18. Additionally or alternatively, the network interface 56 may include, e.g., an Internet client. The media studio 12 may receive media input items 80 from the cameras 20 and operator console 18 indirectly, via the wide area network 26, e.g., the Internet. The media input items 80 received via the network interface 56 may be media data which has been compressed, according to, e.g., H.264/MPEG-4 Advanced Video Coding standards (AVC), or another compression standard as is known. Audio media data may be compressed, e.g., according to Advanced Audio Coding (AAC).

Additionally, the media studio 12 may receive a fifth media input item 83 via high-definition multimedia interface (HDMI). HDMI is a wired interface which may be used to transfer the fifth media input item 83 from, for example, a camera 20 to the media studio 12. The fifth media input item 83 received via the HDMI may be uncompressed data.

An input multiplexer (mux) 70 may be a portion of the processor 52 and/or a separate electronic circuit, and may be implemented as hardware, firmware, software, or a combination of any or all of hardware, firmware, or software. In the first exemplary implementation, the input mux 70 is communicatively coupled to the network interface 56, first, second, third, and fourth decoders 72*a*, 72*b*, 72*c*, 72*d*, third encoder 78*c*, and the auxiliary interface 58. The input mux 70 receives the first, second, third, and fourth media input items 80*a*, 80*b*, 80*c*, 80*d* (collectively media input items 80) from the network interface, and may additionally receive the fifth media input item 83. The input mux 70 is programmed to route the media input items 80 and additional media input item 83, e.g., to the decoders 72, or the encoder 78*c* for further processing.

For example, as further shown in FIG. 4, the input mux 70 may route the first, second, third, and fourth media input items 80*a*, 80*b*, 80*c*, 80*d* respectively to decoders 72*a*, 72*b*, 72*c*, 72*d*. The input mux 70 may further route the media input item 83, received via HDMI, to the third encoder 78*c*.

The foregoing is only an example of how media input items 80 may be routed. In principle, any of the input media items 80, 83 may be routed to any of the decoders 72. In some cases, the routing may be indirect. For example, the media input item 83, may, as discussed above, be received as uncompressed media data. In order for this data to be in a similar or same format to the other media input items 80, the media input item 83 may be compressed. Following compression, for example according to H.264/MPEG-4 AVC, the media input item 83 may also be routed to one of the decoders 72.

The decoders 72 generally decompress media input items, i.e., receive compressed media input items and generate, based on the received media input items, decompressed media input items. In order to compensate for variation in latency between multiple media input items, the decoders 72 may be programmed to time synchronize the media input items during decompression. The decoders 72 may be included in the processor 52 and/or may be one or more separate electronic circuits, and may be implemented as hardware, firmware, software, or a combination of any or all of hardware, firmware, or software.

For example, still referring to FIG. 4, the first decoder 72*a* may receive the media input item 80*a* from the input mux 70 compressed according to the standard H.264/MPEG4 AVC. The decoder 72*a* may decompress the media input item 80*a* and generate the decompressed media input item 80*a*' in Full-HD and may further provide the decompressed media input item 80*a*' to a video processor 74 and the PIP generator 76.

In a similar manner, each of the second, third, and fourth decoders 72*b*, 72*c*, 72*d* may receive, respectively, second, third, and fourth media input items 80*b*, 80*c*, 80*d* as compressed data, e.g., according to the standard H.264/MPEG4 AVC, and generate respective decompressed media input items 80*b*', 80*c*', 80*d*'. Each of the decompressed media input items 80*a*', 80*b*', 80*c*', 80*d*' may be provided to the video processor 74 and the PIP generator 76. The decompressed media input items 80*a*', 80*b*', 80*c*', 80*d*' may be referred to collectively as decompressed media input items 80' herein.

The decoders 72 may decompress media input items compressed according to a variety of compression standards. A nonlimiting of example compression standards includes H.264/MPEG4, MPEG2, MPEG1, Advanced Audio Coding (AAC), etc. Other compression standards, including future compression standards, may be used.

The encoders 78 generally compress media input items, i.e., receive uncompressed media input items, e.g., in Full-HD, and generate, based on the received media input items, compressed media input items. The compression may be, e.g., according to the standard H.264/MEG4 AVC. Other compression standards may be used. The encoders 78 may be included in the processor 52 and/or may be one or more separate electronic circuits, and the encoders 78 may be implemented as hardware, firmware, software, or a combination of any or all of hardware, firmware, or software.

The media studio 12 may further include one or more transcoders (not shown). The transcoders may be included in the processor 52 and may perform, e.g., digital-to-digital conversion of one encoding to another, such as for video files (e.g., MPEG2, MPEG4) and audio files (e.g., MP3, WAV).

As shown in FIG. 4, a first encoder 78a may receive a media output item 84a from the video processor 74. The media output item 84a may be decompressed.

The first encoder 78a may generate a media output item 84a'. The media output item 84a' may be compressed according to, e.g., H.264/MPEG4 AVC. The first encoder 78a may output the compressed media output item 84a', for example, via the network 14 to one or more viewers 22. The compressed media output item 84a' may be generated according to a Standard Quality (SQ) format. The standard quality format may include a relatively low resolution or bit rate to accommodate, e.g., viewers 22 that are compatible with the low resolution or bit rate. Additionally, the first encoder 78a may, via an auxiliary interface 58, store the compressed media output item 84a' to the storage devices 23.

A second encoder 78b may receive a media output item 84b from the video processor 74. The media output item 84b may be generated according to a High Quality (HQ) format. The high quality format may include, e.g., Full-high definition (HD) with a higher resolution and bit rate in comparison to the standard quality format. The media output item 84b, as output from the video processor 74, may be decompressed.

The second encoder 78b may generate the media output item 84b'. The media output item 84b' may be compressed according to, e.g., H.264/MPEG4 AVC. The second encoder 78b may output the compressed media output item 84b', for example, via the network 14 to one or more viewers 22. The compressed media output item 84b' may be generated, e.g., in Full high-definition (HD) and may be output to viewers 22 configured to accommodate Full-HD. Further, the compressed media output item 84b' may be stored, for example in a storage device 23 for future use.

The fourth encoder 78d may receive a multiview media item 86 from the PIP Generator 76 which may be uncompressed and formatted, e.g., in Full-HD. The fourth encoder 78b may generate the multiview media item 86' compressed according to H.264/MPEG4 AVC. The fourth encoder 78d may output the compressed multiview media item 86', via the network 14, to the operator console 18.

Further, as shown in FIG. 4, the third encoder 78c may receive the media input item 83 in an uncompressed format, and output the media input item 83' compressed according to H.264/MPEG4 AVC to the storage device 23 via the auxiliary interface 58.

The media studio 12 includes a video processor 74 which generates first, second, and third media output items 84a, 84b, 84c. The video processor 74 may be programmed, e.g., to process high-definition media data. The video processor 74 may be included in the processor 52 and/or may be one or more separate electronic circuits, and may be implemented as hardware, firmware, software, or a combination of any or all of hardware, firmware, or software.

The video processor 74 is programmable to receive commands from the operator console 18 and perform video processing functions such as switching, mixing, compositing, scaling, morphing, etc. based on the commands. The video processor 74 may further be programmable to perform video processing functions based on one or more predetermined rules, described below. The first, second, and third media output items 84a, 84b, 84c may include data from one or more of the decompressed media input items 80a', 80b', 80c', 80d', 83. As a first example, based on a first command from the operator console 18, the video processor 74 may generate the first, second, and third media output items 84a, 84b, 84c to include one of the decompressed media input items 80', e.g., the decompressed media input item 80b'. Upon receiving a second command from the operator console 18, the video processor 74 may switch to generating the first, second, and third media output items 84a, 84b, 84c to include a different one of the decompressed media input items 80', e.g., the media input item 80d'.

The video processor 74 may perform more complex video processing functions such as superimposing a first media input item 80, e.g., 80a', on a background from a second media input item, e.g., 80b', displaying two decompressed media input items 80' side-by-side, fading from one decompressed media input 80' to a second decompressed media input item 80', displaying video from a first decompressed media input item 80' together with audio from a second decompressed media input item 80', etc.

In addition to being programmed to perform video processing functions based on commands received from the operator console 18, the video processor 74 may be programmed to perform video processing functions according to predetermined rules. A nonlimiting list of example rules that may be used in relation to generating the media output item include:

a. a time protocol;
b. an amount of motion in one or more of the media input items;
c. a radio/WiFi signal strength of one or more of the media input items;
d. tracking of a person or an object;
e. a voice or noise level of one or more of the media input items;
f. a quality of one or more of the media input items; and
g. identification of a user of one or more of the media devices 16.

For example, according to an example time protocol, the video processor 74 may switch sequentially between each of four different media input items 80', with each of the four media input items 80' being displayed for a predetermined time period, e.g., 3 seconds. For an example motion-based selection rule, the video processor 74 may identify one of the media input items 80' with a highest amount of motion, or an amount of motion greater than a predetermined motion threshold, for display in the media output item. For an example signal-strength selection rule, the video processor 74 may identify, e.g., one or more media input items 80' with a signal strength above a predetermined signal strength threshold, and display the identified one or more input items 80' sequentially. For an example of person or object tracking, a person or object may be identified, for example, by a command from the operator console 18. The video processor 74 may, based on the identified person or object, select one of the media input items 80' which includes the identified person or object. According to an example voice or noise level selection rule, the video processor 74 may select a media input item associated, e.g., with a highest voice or noise level.

The video processor 74 may further be programmed to perform media processing operations based on downloaded applications. The applications may be event specific. For example, an application may be specific for baseball games. A first camera 20 may be used to capture the pitcher, a second camera 20 to capture the batter, and third and fourth cameras 20 may be used manually by operators to track play in the field. The rule may, based on, e.g., current game conditions, select between the various media input items. The video processor 74 may further be programmed to accept commands from the operator console 18 to override the selection of the rule.

The media studio 12 further includes a picture-in-picture (PIP) generator 76. The PIP generator 76 may be included in the processor 52 and/or may be one or more separate electronic circuits, and may be implemented as hardware, firmware, software, or a combination of any or all of hardware, firmware, or software.

The PIP generator 76 is programmable to receive one or more decompressed media input items 80', 83 and to combine them into a multiview media item 86. The multiview media item 86 may include, for example, four media input items 80', arranged in two rows of two images each. The PIP generator 76 may output the multiview media item 86 to, e.g., the fourth encoder 78d for compression. The fourth encoder 78d may generate a compressed version of the multiview media item 86', which may be transmitted, e.g., via the network 14 to the operator console 18.

According to the first exemplary implementation, as shown in FIG. 4, the media studio 12 may receive, via the network 14, four media input items 80, compressed, e.g., according to the standard H.264/MPEG4 AVC. The four compressed media input items 80 may be passed, via the input mux 70, to four decoders 72, respectively, where the media input items 80 are decompressed, resulting in four HD media input items 80'. The four HD media input items 80' may be provided to the PIP generator 76 and the video processor 74.

The PIP generator may generate a high-definition multiview media item 86 that includes all four media input items 80', arranged such that the may be viewed simultaneously. The high definition media item 86 may be compressed, e.g., according to the standard H.264/MPEG4 AVC by the second encoder 78, generating a compressed multiview media item 86'. The compressed multiview media item 86' may be transmitted via the network 14 to the operator console 18.

As a next step, a user of the operator console 18 may view the multiview media item 86' on the user interface 42 (FIG. 2) of the operator console 18. The user may, e.g., select one of the four media input items 80' to be output by the media studio 12. For example, the user interface 42 may include a touchscreen display, and the user may tap the image to be displayed on the touchscreen display. As described above, the user may additionally select one or more other operations such as scaling, mixing, morphing, providing overlays, etc., in generating the media output item. Based on the input from the user, the operator console 18 may send one or more commands to the media studio 12 indicating operations to be performed in preparing the output media item.

The video processor 74 may be programmed, upon receiving the one or more commands from the operator console 18, to include the selected media input item 80' in the first, second and third media output items 84a, 84b, 84c, and to perform any additional media processing indicated by the commands. The video processor 74 may output the first media output item 84a to the first encoder 78a for compression, e.g., according to the standard H.264/MPEG4. The encoder 78a may output the compressed version of the media output item 84a', for example, via the network 14 to one or more viewers 22. A second, e.g. high-definition media output item 84b may be output to the encoder 78b. The encoder 78b may output a compressed media output item 84b in high-definition format for high-definition viewing. A third version of the media output item 84c may be output via an HDMI to, e.g., the monitor 30.

Additionally or alternatively to outputting the media output item 84b' for viewing, the media studio 12 may store the media output item 84b', and one or more of the media input items 80, 83 in the storage device 23, via the auxiliary interface 58.

Figure 5:
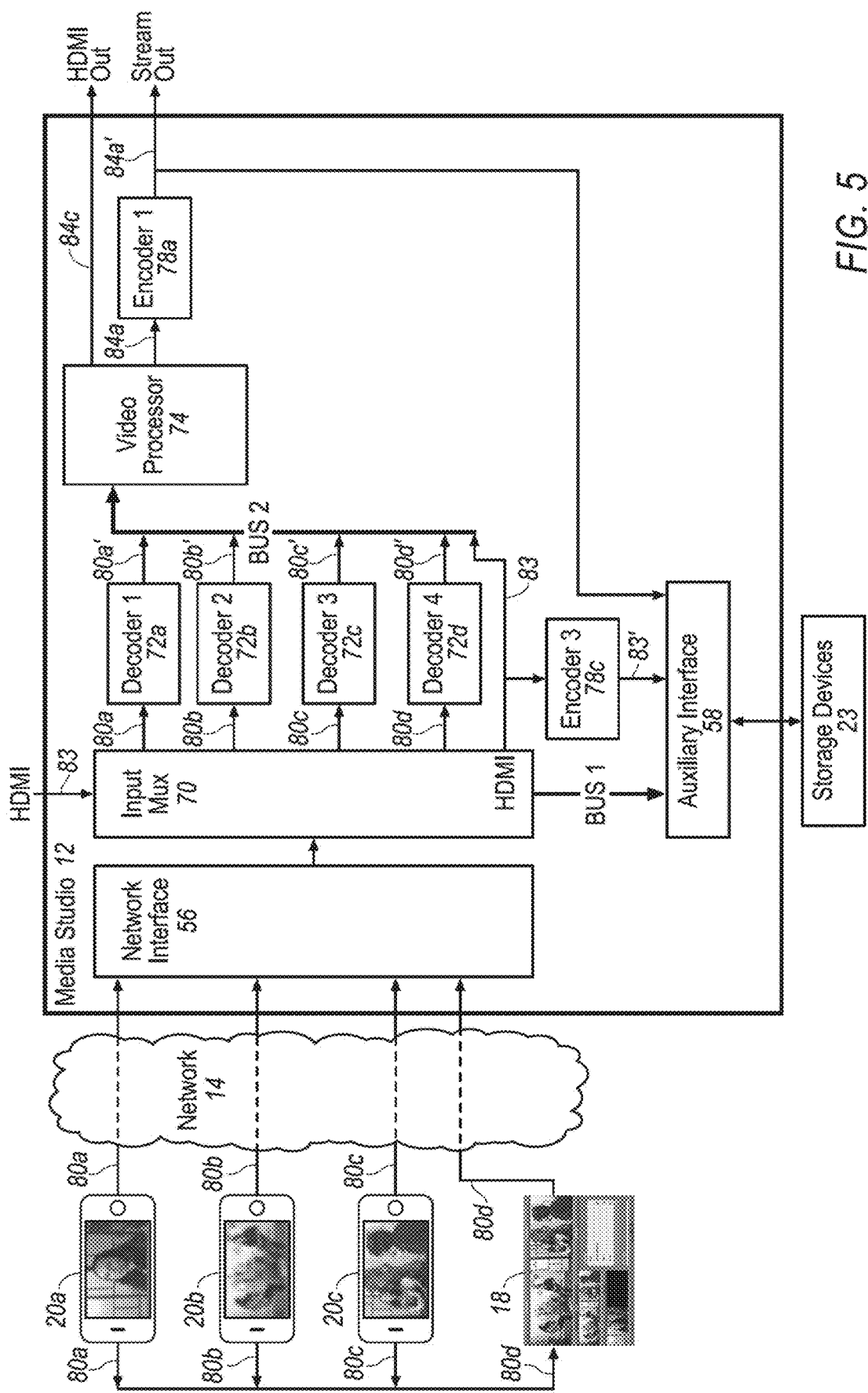

A second exemplary implementation is shown in FIG. 5. In the second implementation, the first, second, and third media input items 80a, 80b, 80c are provided to the operator console 18 directly, for example, via one or more wired or wireless connections, instead of indirectly via the PIP generator 76. The media input items 80a, 80b, 80c may be provided as low resolution stream inputs.

In other aspects, the second exemplary implementation operates in a like manner to the first exemplary implementation. The video processor 74 receives the media input items 80', 83 via the input mux 70 and decoders 72 as described above. The video processor 74 may further receive commands from the operator console 18 providing instructions for the generation of the first and third media output items 84a, 84c. The first media output item 84a may be, e.g., encoded to generate compressed media output item 84a' which may be transmitted to one or more viewers 22. The second media output item, may be, for example, transmitted to the monitor 30. Further, one or more of the media input items 80', 83, and/or the media output item 84a', may be stored to storage devices 23.

Figure 6:
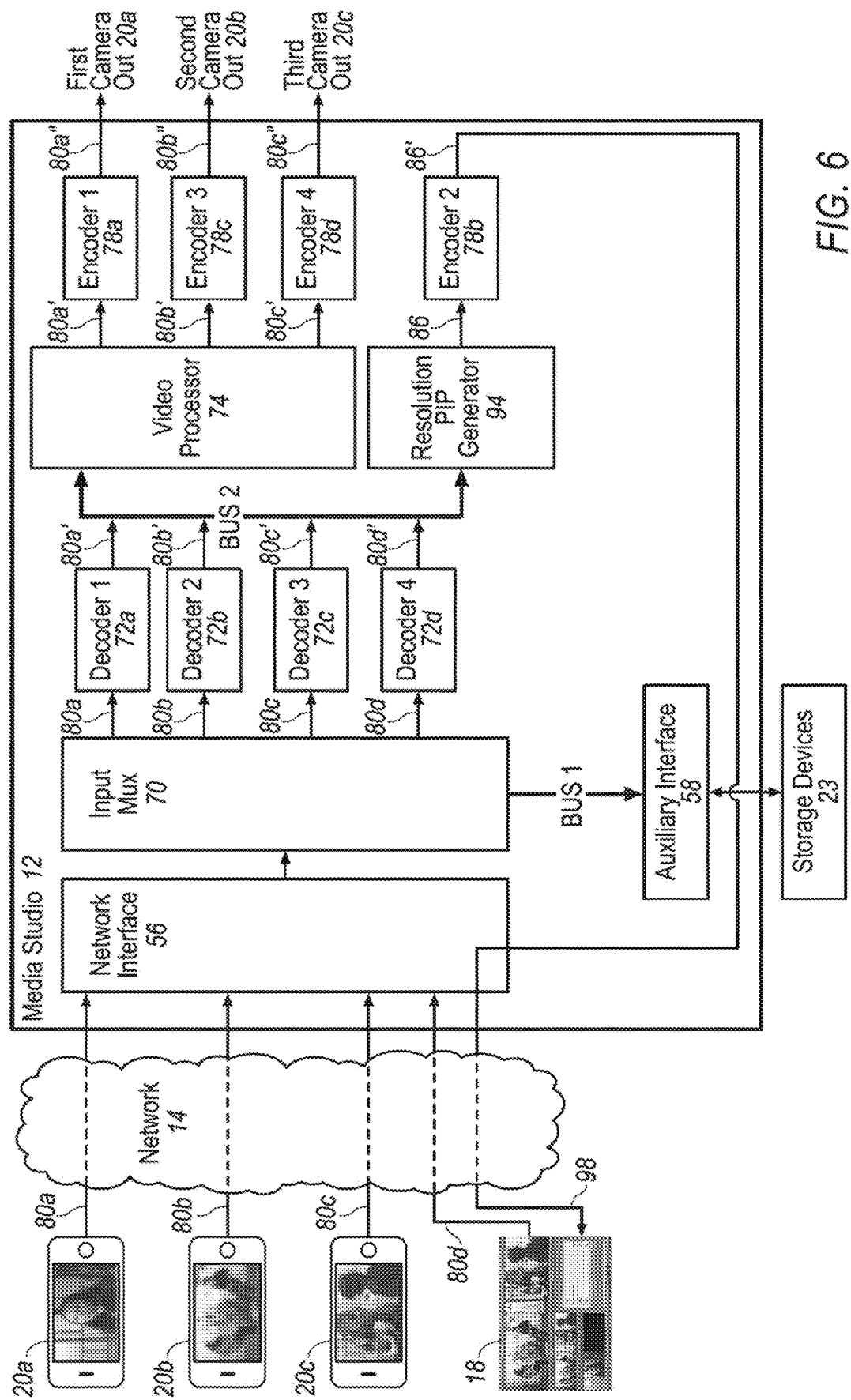

A third exemplary implementation is shown in FIG. 6. In the third implementation, the media studio 12 may be programmed to receive, e.g., first, second, and third media input items 80a, 80b, 80c, and directly output first, second, and third media output items 80a", 80b", 80c". The first, second, and third media output items 80a", 80b", 80c" may be representations respectively of media input items 80a, 80b, 80c, following decompression via the first, second, and third decoders 72a, 72b, 72c and recompression via the first, third, and fourth encoders 78a, 78c, 78d. Each of the first, second, and third media input items 80a", 80b", 80c" may be, e.g., transmitted via the network 14 to storage in a remote server, such as the server 28 (FIG. 1). In this manner, the first, second, and third media input items 80a", 80b", 80c" may be available for further processing at a later time.

In each of the example implementations described above, one or more of the media input items 80 may be stored data that is retrieved from a storage device 23, or received, for example, from the server 28. Further, any of the media input items 80, 83 may be included in the media output item 84. For example, the media input item 83 may additionally or alternatively be included in the media output item 84 in any of the first and second implementations, or one of the media output items of the third implementation. Still further, any or all of the media input items 80, 83 and the media output item 84 may be stored in the storage device 23. The media input items 80, 83 may be stored as compressed data or as decompressed data.

The implementations above are described based on use of the H.264/MPEG4AVC compression standard. This is only intended as an example. Other compression standards such as MPEG1, MPEG2, etc. may also be used as required for compatibility, e.g., with media data sources and media display devices such as the media devices 16.

Exemplary Process Flows

Figure 7:
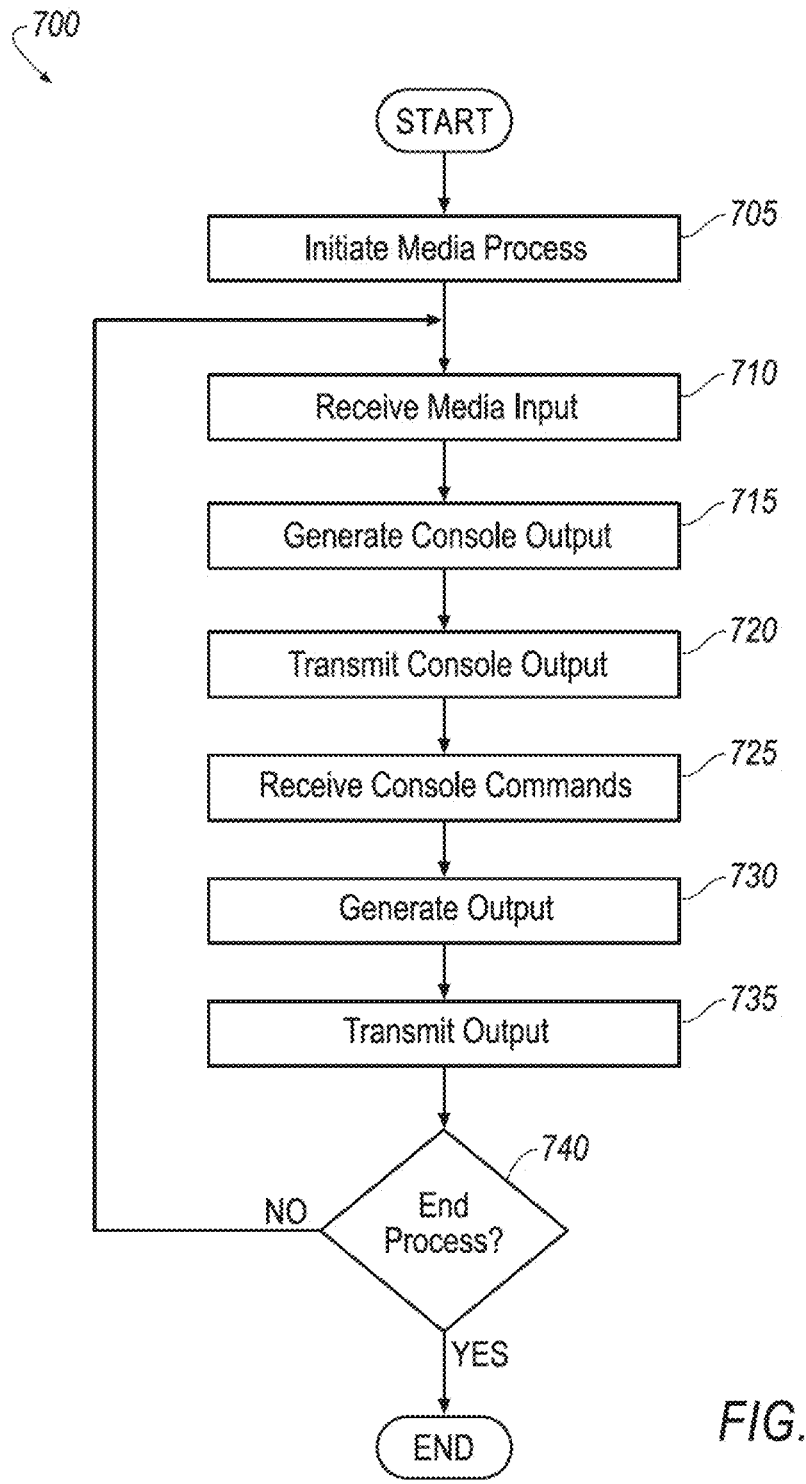
FIG. 7 is a diagram of an exemplary process of capturing and mixing multiple media streams into an output media stream based on commands from a remote operator console.

FIG. 7 is a diagram of an exemplary process 700 to generate a media output item 84 based on one or more media input items 80, 83 under control of the remote operator console 18. The process 700 may be carried out according to computer-executable instructions, e.g., in the media studio 12. The process 700 starts in a block 705.

In the block 705, the media studio 12 recognizes a trigger event for initiating the process 700. For example, the media studio 12 may receive an input from a user via the user interface 54. Additionally or alternatively, the media studio 12 may receive an input from the user via the operator console 18. Still further, the media studio 12 may receive an input, e.g., from the remote server 28 indicating that the user would like to initiate generation of one or more media output items. The process 700 continues in a block 710.

In the block 710, the media studio 12 processor 52 receives one or more media input items 80. As described above, the media studio 12 processor 52 may receive media input items from cameras 20, the operator console 18, and/or from storage devices 23. The media studio 12 processor 52 may receive the media input items via the network 14 or via the direct connection 82. The direct connection 82 may include a high-definition multimedia interface (HDMI). The process 700 continues in a block 715.

In the block 715, the media studio 12 processor 52 generates a multiview media item 86 for the operator console 18. As described above, the picture-in-picture (PIP) generator 76 (FIG. 4) may receive one or more decompressed media input items 80', 83. The PIP generator 76 may generate the multiview media item 86 to include one or more of the media input items 80', 83 displayed simultaneously. For example, the multiview media item 86 may arrange four media input items 80, 83 to be viewed simultaneously in a single display. The process 700 continues in a block 720.

In the block 720, the media studio 12 processor 52 transmits the multiview media item 86 to the operator console 18. The multiview media item 86 may, e.g., be compressed by the encoder 12, and transmitted via the network 14 as compressed media data. The operator console 18 processor 41 may receive and display the multiview media item 86 on the user interface 42. The process 700 continues in a block 725.

In the block 725, the media studio 12 processor 52 receives commands from the operator console 18 processor 41. For example, the user may select, via the user interface 42, one of the media input items 80', 83 for generation of the media output item 84. The user may further select one or more processing functions such as scaling, mixing, morphing, overlaying graphics, etc. for generation of the media output item 84. The operator console 18 processor 41 may transmit one or more commands based on the input from the user, which may be received by the media studio 12 processor 52. The process 700 continues in a block 730.

In the block 730, the media studio 12 processor 52 generates the media output item 84 based on the command received from the operator console 18 processor 41. For example, the media studio 12 processor 52 may receive the command to include the media input item 80c from the third camera 20c in the media output item. The media studio 12 may further receive one or more commands to perform other media processing operations. Based on the commands, the video processor 74 may generate a media output item 84 that includes the media input item 80c from the third camera 20c processed according to the selected media processing operations. The process 700 continues in a block 735.

In the block 735, the media studio 12 processor 52 transmits the media output item 84. The media output item may be transmitted via the network 14 to one or more viewers 22. Additionally or alternatively, the media output item 84 may be transmitted via the network 14 to a remote server 28 for storage. Still further, the media output item 84 may be stored via the auxiliary interface 58 in one or more storage devices 23. The process continues in a block 740.

In the block 740, the media studio 12 processor 52 determines whether an event has occurred to trigger an end of the process 700. For example, the media studio 12 may receive an input from the user interface 42 or from the operator console 18 processor 41 indicating that the process should end. Alternatively, the media studio 12 may determine that no new data and/or no new commands have been received for a predetermined time, e.g., 30 seconds, and may determine that the process 700 should end. Still further, the media studio 12 processor 52 may receive an input from the user interface 54 or from the operator console 18 processor 41 indicating that the media studio 12 should generate the media output item according to a predetermined rule. In this case, the media studio 12 processor 52 may end the process 700 and initiate the process 800, described below. If no trigger event is detected, the process 700 may continue in the block 710.

Figure 8:
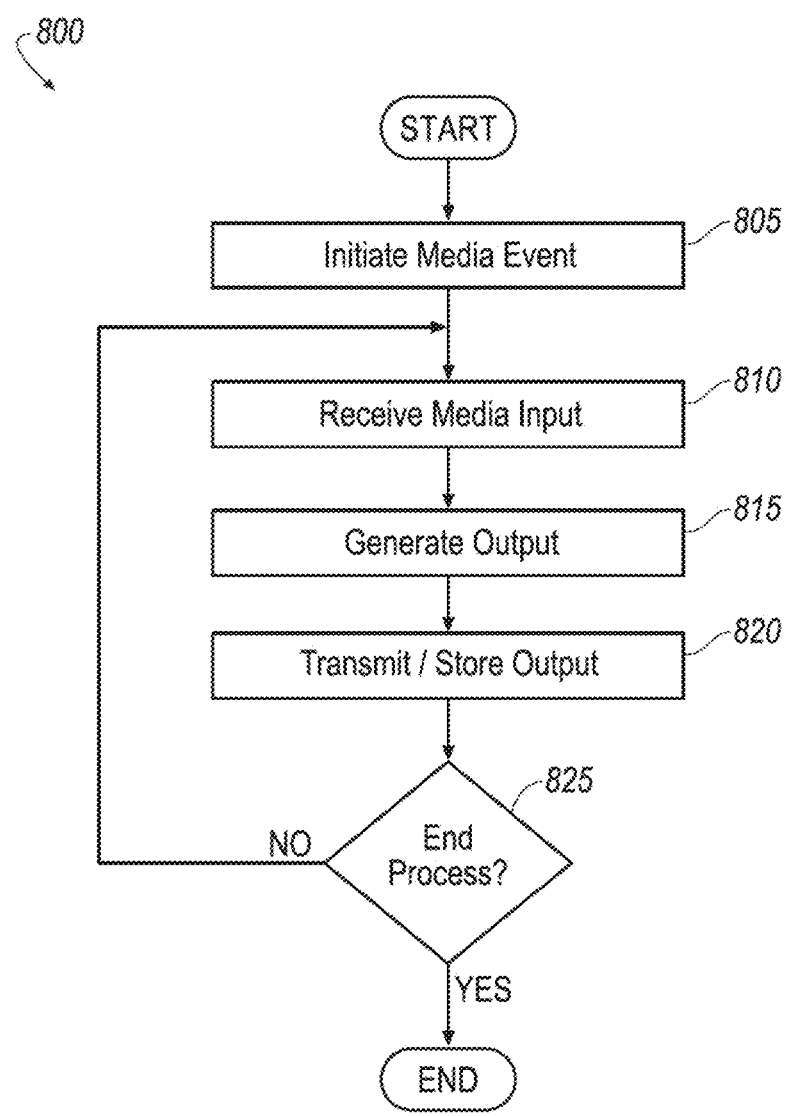
FIG. 8 is a diagram of an exemplary process of capturing and mixing multiple media streams into an output media stream, based on a predetermined rule.

FIG. 8 is a diagram of an exemplary process 800 for generating a media output item 84 based on one or more media input items 80, 83 based on a predetermined rule. The process 800 may be carried out according to computer-executable instructions, e.g., in the media studio 12. The process 800 starts in a block 805, and, as described below, may in some cases be initiated subsequent to block 740 of the process 700.

In the block 805, the media studio 12 processor 52 recognizes a trigger event for initiating the process 800. For example, the media studio 12 processor 52 may receive an input from a user via the user interface 54. Additionally or alternatively, the media studio 12 processor 52 may receive an input from the user from the operator console 18 processor 41. Still further, the media studio 12 may receive an input, e.g., from the remote server 28 indicating that the user would like to initiate generation of one or more media output items 84 according to a predetermined rule. The input may be received from the user interface 54 or from the operator console 18 processor 41, as described above with reference to the block 740 of process 700. Alternatively, the input may be received, e.g., upon turning on the media studio 12. The process 800 continues in a block 810.

In the block 810, the media studio 12 processor 52 receives one or more media input items. As described above, the media studio 12 processor 52 may receive media input items 80 from cameras 20 and/or from the operator console 18 via the network 14. Additionally or alternatively, the media studio 12 processor 52 may receive a media input item 83 via the direct connection 82 such as a high definition multimedia interface (HDMI). The process 800 continues in a block 815.

In the block 815, the media studio 12 processor 52 generates a media output item 84 from one or more of the media input items 80, 83 according to a predetermined rule. For example, the predetermined rule may specify that the media studio 12 processor 52 should sequentially switch each of the available media input items 80, 83, at a first predetermined time period, to the media output item 84. For example, the media studio 12 processor 52 may switch, every three seconds, from one media input item 80, 83 to a next media input item 80, 83, and continue to loop through the media input items 80, 83. Other predetermined rules may be used, as described above. The process 800 continues in a block 820.

In the block 820, the media studio 12 processor 52 transmits the media output item 84. The media output item 84 may be transmitted via the network 14 to one or more viewers 22. Additionally or alternatively, the media output item 84 may be transmitted via the network 14 to a remote server 28 for storage. Still further, the media output item 84 may be stored via the auxiliary interface 58 in one or more storage devices 23. The process continues in a block 825.

In the block 825, the media studio 12 processor 52 determines whether an event has occurred to trigger an end of the process 800. For example, the media studio 12 processor 52 may receive an input from the user interface 42 or from the operator console 18 indicating that the process should end. Alternatively, the media studio 12 processor 52 may determine that a timeout has occurred, i.e., that the rule is intended to run for second predetermined time period, e.g., 30 minutes, and the second predetermined time period has been reached. Still further, the media studio 12 processor 52 may receive an input indicating that the user of the operator console 18 would like to manually control the generation of the media output item 84 via the operator console 18. In this case, the process 800 may end, and the media studio may (re)initiate the process 700, starting in the block 705. If no trigger event is detected, the process 800 may continue in the block 810.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Networked devices such as those discussed herein generally each include instructions executable by one or more networked devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a networked device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with rules of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method for media processing, the method comprising:
    receiving, by a plurality of decoders via a network interface, a plurality of media input items, each received from a respective one of a plurality of media devices in communication with the network interface;
    communicating decoded instances of the plurality of media input items from the plurality of decoders to a picture-in-picture (PIP) generator and to a video processor, the plurality of decoders, the network interface, the PIP generator, and the video processor integrated within a portable device;
    generating, by the PIP generator, a multiview media item from the decoded instances of the plurality of media input items received from the plurality of decoders, the multiview media item comprising at least some of the plurality of media input items arranged to be viewed simultaneously;
    communicating, by the PIP generator, the multiview media item to an operator console for display within an interactive user interface of the operator console;
    receiving, by the video processor from the operator console responsive to the operator console receiving the multiview media item and based on user interactions with the multiview media item via the interactive user interface, a set of video processing instructions indicating selection of at least one media input item from the multiview media item for inclusion in a media output item and indicating at least one video processing function to perform on the at least one media input item; and generating, by the video processor, the media output item from the decoded instances of the plurality of media input items received from the plurality of decoders, the media output item generated in accordance with the set of video processing instructions to comprise the at least one media input item selected and processed by the video processor in accordance with the at least one video processing function.

2. The method of claim 1, further comprising:
displaying, by the operator console, the media output item simultaneously with displaying the multiview media item in the interactive user interface.

3. The method of claim 1, wherein the at least one video processing function to perform on the at least one media input item comprises at least one of: scaling the at least one media input item, mixing the at least one media input item, morphing the at least one media input item, compositing the at least one media input item, adding an overlay to the at least one media input item, tracking of a specific character or object in the at least one media input item, or smart tagging of the at least one media input item.

4. The method of claim 1, wherein the video processor is configured to generate the media output item from the plurality of media input items further in accordance with applying predetermined rules to the plurality of media input items, the predetermined rules comprising at least one of: a time protocol; an amount of motion in one or more of the media input items; a wireless signal strength of one or more of the media input items; tracking of a person or an object in one or more of the media input items; a voice or noise level in one or more of the media input items; a video quality of one or more of the media input items; or an identification of a user of one or more of the plurality of media devices.

5. The method of claim 1, wherein generating the multiview media item comprises generating a PIP display of at least two of the decoded instances of the plurality of media input items received from the plurality of decoders.

6. A media processing system comprising:
a media studio integrated within a portable device, the media studio comprising:
a network interface to provide a local area network by which to communicatively couple with a plurality of media devices and with an operator console;
a plurality of decoders coupled with the network interface, each to receive and decode a respective one of a plurality of media input items from a respective one of the plurality of media devices;
a picture-in-picture (PIP) generator configured to:
generate a multiview media item from the plurality of media input items as received from the plurality of decoders, the multiview media item comprising at least some of the plurality of media input items arranged to be viewed simultaneously; and
communicate the multiview media item to the operator console for display within an interactive user interface; and
a video processor configured to:
receive a set of video processing instructions from the operator console responsive to the operator console receiving the multiview media item and based on user interactions with the multiview media item via the interactive user interface, the set of video processing instructions indicating selection of at least one media input item from the multiview media item for inclusion in a media output item and indicating at least one video processing function to perform on the at least one media input item; and
generate the media output item from the plurality of media input items, as received from the plurality of decoders, in accordance with the set of video processing instructions, such that the media output item comprises the at least one media input item selected and processed by the video processor in accordance with the at least one video processing function.

7. The media processing system of claim 6, further comprising:
the operator console, implemented by a computational system separate from the media studio and communicatively coupled with the media studio via a wireless connection of the local area network.

8. The media processing system of claim 7, wherein:
the operator console is further configured to display the media output item simultaneously with displaying the multiview media item in the interactive user interface.

9. The media processing system of claim 7, wherein:
the operator console is further configured as one of the plurality of media devices, such that one of the plurality of media input items is received by the network interface from the operator console.

10. The media processing system of claim 6, wherein the PIP generator is configured to generate the multiview media item as a PIP display of at least two of the plurality of media input items received from the plurality of decoders.

11. The media processing system of claim 6, wherein the PIP generator is further configured to compress the multiview media item prior to communicating the multiview media item to the operator console.

12. The media processing system of claim 6, wherein the at least one video processing function to perform on the at least one media input item comprises at least one of: scaling the at least one media input item, mixing the at least one media input item, morphing the at least one media input item, compositing the at least one media input item, adding an overlay to the at least one media input item, tracking of a specific character or object in the at least one media input item, or smart tagging of the at least one media input item.

13. The media processing system of claim 6, wherein the video processor is configured to generate the media output item from the plurality of media input items further in accordance with applying predetermined rules to the plurality of media input items, the predetermined rules comprising at least one of: a time protocol; an amount of motion in one or more of the media input items; a wireless signal strength of one or more of the media input items; tracking of a person or an object in one or more of the media input items; a voice or noise level in one or more of the media input items; a video quality of one or more of the media input items; or an identification of a user of one or more of the plurality of media devices.

14. The media processing system of claim 6, wherein the video processor is configured to generate the media output item concurrently with the plurality of media devices capturing at least a portion of the media input items.

15. The media processing system of claim 6, wherein the media studio further comprises:
an input multiplexer to route the media input items from the network interface to the plurality of decoders.

16. The media processing system of claim 6, wherein the media studio further comprises:

a set of encoders, each coupled with the video processor to receive the media output item and to generate a respective encoded media output item according to a respective video format.

17. The media processing system of claim 6, wherein the decoders are further configured to time-synchronize the media input items, such that multiview media item comprises the at least some of the plurality of media input items arranged to be viewed simultaneously as time-synchronized views.

18. The media processing system of claim 6, wherein the network interface is configured to communicatively couple with the operator console wirelessly over the local area network.

19. The media processing system of claim 6, wherein the network interface comprises:
- a router to provide the local area network; and
- an Internet client by which to provide Internet streaming of the media output item.

20. The media processing system of claim 6, wherein the network interface is configured to communicatively couple with at least a first of the plurality of media devices via a wired connection, and to communicatively couple with at least a second of the plurality of media devices via a wireless connection.

* * * * *